(12) United States Patent
Namuduri et al.

(10) Patent No.: US 10,479,220 B2
(45) Date of Patent: Nov. 19, 2019

(54) HYBRID POWERTRAIN WITH DUAL ENERGY STORAGE DEVICES

(71) Applicant: GM GLOBAL TECHNOLOGY OPERATIONS LLC, Detroit, MI (US)

(72) Inventors: Chandra S. Namuduri, Troy, MI (US); Venkata Prasad Atluri, Novi, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 436 days.

(21) Appl. No.: 15/484,537

(22) Filed: Apr. 11, 2017

(65) Prior Publication Data
US 2018/0291859 A1     Oct. 11, 2018

(51) Int. Cl.
  *B60L 50/61*   (2019.01)
  *B60L 58/18*   (2019.01)
  *B60K 6/28*   (2007.10)
  *F02N 11/08*   (2006.01)
  *B60R 16/04*   (2006.01)

(52) U.S. Cl.
  CPC ............... *B60L 50/61* (2019.02); *B60K 6/28* (2013.01); *B60L 58/18* (2019.02); *F02N 11/0866* (2013.01); *B60R 16/04* (2013.01); *B60Y 2200/92* (2013.01); *B60Y 2300/91* (2013.01); *B60Y 2400/60* (2013.01); *B60Y 2400/61* (2013.01); *Y10S 903/906* (2013.01); *Y10S 903/907* (2013.01)

(58) Field of Classification Search
  CPC ............. F02N 11/08–087; B60L 50/40; B60L 50/60–66; B60L 58/18; B60R 16/03–04
  See application file for complete search history.

(56) References Cited

U.S. PATENT DOCUMENTS

| | | | |
|---|---|---|---|
| 2002/0158513 A1* | 10/2002 | Amano | F02N 11/0866 307/10.6 |
| 2003/0131816 A1* | 7/2003 | Yang | F02D 41/062 123/179.1 |
| 2006/0169237 A1* | 8/2006 | Yang | F02N 11/0866 123/179.5 |
| 2011/0012424 A1* | 1/2011 | Wortberg | H02J 7/1423 307/10.1 |

(Continued)

*Primary Examiner* — Rexford N Barnie
*Assistant Examiner* — David A Shiao
(74) *Attorney, Agent, or Firm* — Quinn IP Law (57) ABSTRACT

A powertrain includes a motor-generator that is coupled to an engine. A starter mechanism is coupled to the engine. A first energy storage device is disposed in a parallel electrical relationship with the starter mechanism. A second energy storage device is disposed in a parallel electrical relationship with the motor-generator. The electrical circuit exhibits a first electrical resistance between the first energy storage device and the motor-generator, and a second electrical resistance between the second energy storage device and the motor-generator. The first electrical resistance is greater than the second electrical resistance so that electrical energy from the motor-generator more easily flows to the second energy storage device than the first energy storage device, and the motor-generator more easily draws electrical energy from the second energy storage device than from the first energy storage device.

18 Claims, 5 Drawing Sheets

(56) References Cited

U.S. PATENT DOCUMENTS

2012/0319483 A1* 12/2012 Scruggs ................ B60R 16/033
                                                    307/52
2018/0233943 A1* 8/2018 Koizumi ................ B60L 58/20
2018/0281601 A1* 10/2018 Kinoshita ............. B60L 3/0046

* cited by examiner

HYBRID POWERTRAIN WITH DUAL ENERGY STORAGE DEVICES

INTRODUCTION

The disclosure generally relates to a powertrain for a vehicle.

Vehicles with an electrified powertrain may include an internal combustion engine that is used as a primary driver of the vehicle, and incorporate at least one electric motor-generator to either generate electrical power from torque provided from the engine when the engine is producing excess torque, or provide additional torque to the engine to assist the engine when the engine requires additional torque production.

Vehicles with an electrified powertrain tend to be either a single voltage system, or a dual voltage system. Vehicles with an electrified powertrain using the single voltage system generally rely on a single high-power energy storage device (generally at a nominal 12 volts) to provide electrical energy for accessory loads when the engine is off, engine cranking for starting, engine torque addition, etc. The single high-power energy storage device also absorbs electrical energy from the motor-generator when the vehicle is braking or when the motor-generator is providing more electrical power than the accessory loads require. Vehicles with an electrified powertrain using the dual voltage system generally rely on two different energy storage devices. The primary or cranking energy storage device is nominally a 12 volt device, and is used to provide energy for loads during key-off situations. The cranking energy storage device is also used to provide energy during starting events. The second energy storage device is typically of a higher voltage, and is generally charged by the motor-generator at the higher voltage. A DC-DC converter is required to transfer energy from the higher voltage energy storage device and/or the motor generator to the lower voltage (e.g., 12 volt) cranking energy storage device and/or to the accessory loads.

SUMMARY

A powertrain for a vehicle is provided. The powertrain includes an engine and an electrical circuit. The electrical circuit includes a motor-generator that is coupled to the engine. The motor-generator is operable as either a motor to provide power to the engine, or as a generator to generate an electrical current from power supplied from the engine. A starter mechanism is coupled to the engine, and is operable to start the engine from a cranking current. A first energy storage device is disposed in a parallel electrical relationship with the starter mechanism. The first energy storage device is operable to supply the cranking current to the starter mechanism. A second energy storage device is disposed in a parallel electrical relationship with the motor-generator. The second energy storage device is operable to receive a current from the motor-generator, or provide a current to the motor generator. A first auxiliary electric system is disposed in a parallel electrical relationship with both the first energy storage device and the second energy storage device. The electrical circuit exhibits a first electrical resistance between the first energy storage device and the motor-generator, and exhibits a second electrical resistance between the second energy storage device and the motor-generator. The first electrical resistance is greater than the second electrical resistance so that electrical energy from the motor-generator more easily flows to the second energy storage device than the first energy storage device, and so that the motor-generator more easily draws electrical energy from the second energy storage device than from the first energy storage device.

In one embodiment of the disclosure, a ratio of the first electrical resistance divided by the second electrical resistance is equal to or greater than 1.5. In one aspect of the disclosure, the powertrain may be characterized by the electrical circuit lacking a switch disposed between the first energy storage device and the motor-generator for controlling an electrical current between the first energy storage device and the motor-generator.

In another embodiment of the disclosure, a first resistor may be disposed within the electrical circuit, between the first energy storage device and the motor-generator. The first resistor provides at least part of the first electrical resistance. A second resistor may be disposed within the electrical circuit, between the second energy storage device and the motor-generator. The second resistor provides at least part of the second electrical resistance. In one embodiment of the disclosure, the first resistor and the second resistor are disposed with a shared terminal with the second energy storage device. In another embodiment of the disclosure, the first resistor and the second resistor are arranged in series between the first energy storage device and the second energy storage device.

In one aspect of the disclosure, the first resistor is not disposed within the electrical circuit between the first energy storage device and the starter mechanism, such that the first resistor does not have to carry the cranking current used to operate the starter mechanism. In another aspect of the disclosure, the second resistor is not disposed within the electrical circuit between the second energy storage device and the first auxiliary electric system, such that the second resistor does not have to carry a current between the second energy storage device and the first auxiliary electric system.

In one embodiment of the disclosure, the first resistor exhibits a higher electrical resistance than the second resistor.

In another aspect of the disclosure, the second energy storage device includes a first switch for opening and closing electrical communication between the electrical circuit and the second energy storage device. In one embodiment, the first switch may include a bi-directional blocking switch having a first open state and a first closed state. The first switch is operable to prevent an electrical current in both a first direction and an opposite second direction when disposed in the first open state. The first switch is operable to conduct an electrical current in either the first direction or the opposite second direction when disposed in the first closed state.

In another aspect of the disclosure, the first energy storage device and the second energy storage device each operate at a substantially identical voltage. The first energy storage device is operable to store a first amount of charge and provide short bursts of power within a first amperage range over a first temperature range. The second energy storage device is operable to store a second amount of charge and provide short bursts of power at a second amperage over a second temperature. The first amount of charge of the first energy storage device is greater than the second amount of charge of the second energy storage device. The first amperage range of the first energy storage device is greater than the second amperage range of the second energy storage device. The first temperature range over which the first energy storage device is operable to provide power is greater than the second temperature range over which the second energy storage device is operable to provide power.

In one embodiment of the powertrain, the first energy storage device is a lead acid battery, and the second energy storage device is one of a Li-Ion battery or an ultracapacitor.

In another aspect of the disclosure, the electrical circuit may include a second auxiliary electric system that is disposed in a parallel electrical relationship with both the first energy storage device and the second energy storage device. The first auxiliary electric system includes at least one electric component that operates with an allowable voltage fluctuation of equal to or less than a first predetermined value. The second auxiliary electric system includes at least one electric component that operates with an allowable voltage fluctuation of greater than a second predetermined value.

In another aspect of the disclosure, the electrical circuit may include a DC-DC converter, disposed within the electrical circuit, between the first auxiliary electric system and the second auxiliary electric system.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a powertrain is generally shown at 20. The powertrain 20 is for a vehicle. The vehicle may include any moveable platform, such as but not limited to, an automotive vehicle, such as, a car, a truck, etc., or a non-automotive vehicle, such as, a farm vehicle, a marine vehicle, an aviation vehicle, etc.

Figure 1:
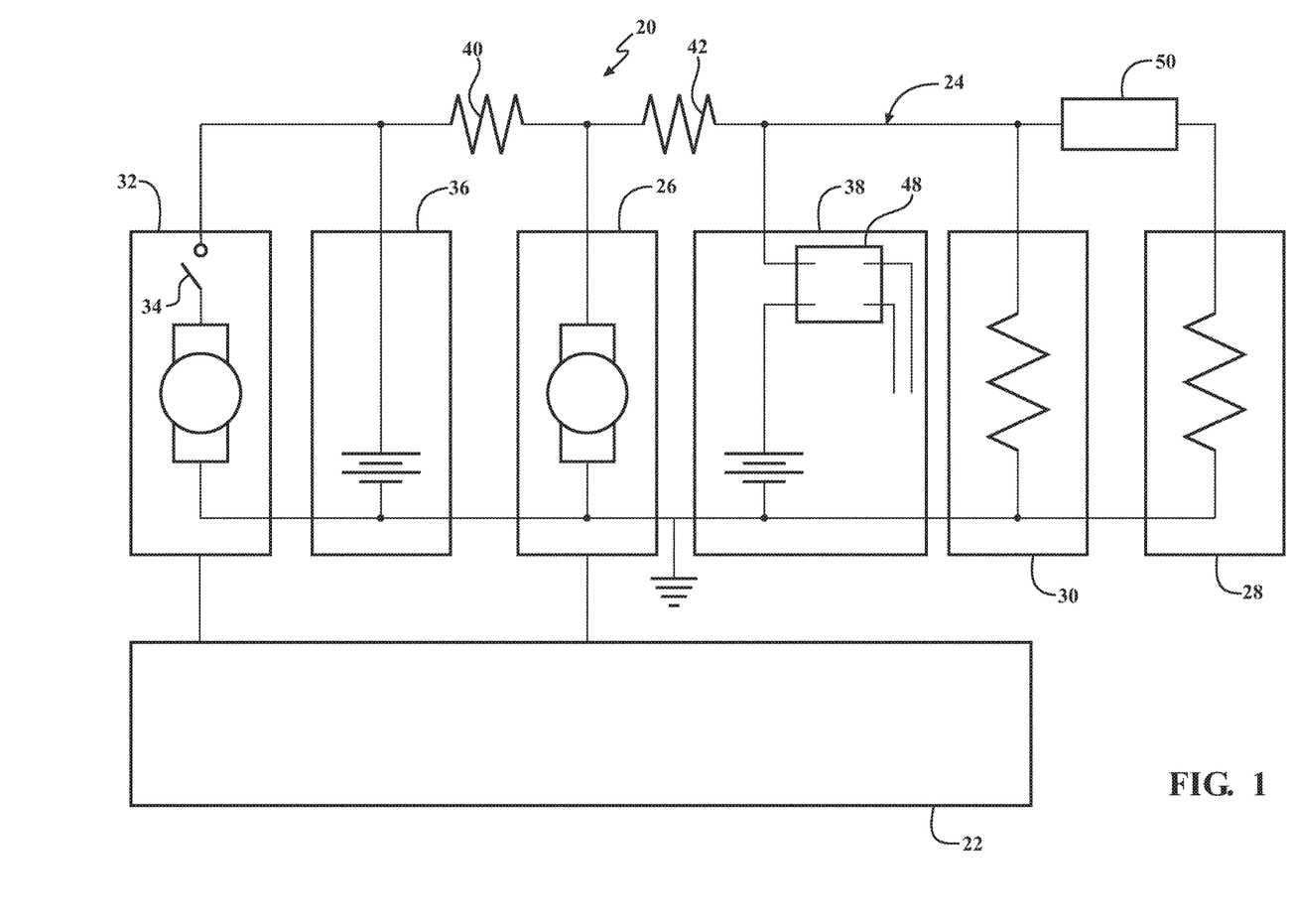
FIG. 1 is a schematic diagram of a first embodiment of a powertrain for a mild hybrid vehicle.

Referring to FIG. 1, a first embodiment of the powertrain 20 generally shown. The powertrain 20 includes an engine 22. In some embodiments, the engine 22 may be considered the prime mover of the vehicle. The engine 22 may include an internal combustion engine 22, such as but not limited to, a gasoline engine 22, a diesel engine 22, a propane engine 22, etc. The engine 22 operates as is known in the art to generate torque through combustion of fuel. The torque is transferred to one or more drive wheels through a transmission as is known. The specific type, style, configuration, and/or size of the engine 22 is not pertinent to the teachings of the disclosure, and are therefore not described in detail herein.

The powertrain 20 further includes an electrical circuit 24. The electrical circuit 24 includes various components, connected together by wiring to form a path in which electrons from a voltage or current source may flow. Accordingly, as described herein, the electrical circuit 24 includes both the various electrical components, but also the wiring and/or connections required to connect the electrical components in the manner described below.

The electrical circuit 24 includes a motor-generator 26. The motor-generator 26 is coupled to the engine 22, and is operable as either a motor to provide power to the engine 22, or as a generator to generate an electrical current from power supplied from the engine 22. When operated as a motor, the motor-generator 26 assists the engine 22 in torque production to propel the vehicle. When operated as a generator, the motor-generator 26 may generate electricity to recharge an energy storage device, or to power one or more electrical components of a first auxiliary electric system 28 (described in greater detail below) and/or a second auxiliary electric system 30 (described in greater detail below).

The first auxiliary electric system 28 may contain at least one electrical load whose change in performance due to a predefined change in operating voltage is readily noticeable and may be unacceptable to the vehicle customer. Such loads are hereafter referred to as voltage-sensitive loads. The voltage variation across such loads during various operating conditions such as autostarts, energy recuperation and torque boost using the starter motor 32 and motor/generator 26, needs to be maintained within a predefined value to meet customer acceptable vehicle level performance. In addition, the first auxiliary electric system 28 may contain at least one electrical load which needs to be provided with uninterrupted electric power with the engine 22 off, in case one of the energy storage devices is unable to provide power for any reason. Those loads whose change in performance is not readily noticeable to the customer due to a voltage change beyond a predefined range or minimum and maximum values are hereafter referred to as non-voltage-sensitive loads. The second auxiliary electric system 30 consisting of non-voltage-sensitive loads, may be disposed in a parallel electrical relationship with both a first energy storage device 36, a second energy storage device 38, and the motor-generator 26.

The motor-generator 26 may include any device capable of being coupled to the engine 22, and operating as a motor to generate torque, or as a generator to generate electricity. For example, the motor-generator 26 may include, but is not limited to, a brushless electric motor-generator 26 or other similar device. The motor-generator 26 may be coupled to the engine 22 in any suitable manner. For example, the motor-generator 26 may be coupled to a crankshaft of the engine 22 via an endless belt to transmit torque between the crankshaft and the motor-generator 26. It should be appreciated that the motor-generator 26 may alternatively be coupled to the engine 22 in some other manner not shown or described herein.

Generally, the motor-generator 26 operates as a generator when the engine 22 is producing more torque than is required for the current operating conditions of the vehicle, and operates as a motor when the vehicle requires more torque than the engine 22 is currently producing. For example, the motor-generator 26 may operate as a motor when the vehicle is moving at a certain speed or accelerating, and is not braking/slowing down. Alternatively, the motor-generator 26 may operate as a generator when the vehicle is slowing down, braking, or is stopped.

The motor-generator 26 may include an integrated power inverter (not shown). The integrated power inverter is operable to convert direct current (DC) provided by an energy storage device to alternating current (AC) to power the motor-generator 26 as a motor. Additionally, the integrated power inverter is operable to convert AC to DC to be stored in an energy storage device when the motor-generator 26 functions as a generator. Additionally, the integrated power inverter can convert AC to DC to supply current to the first auxiliary electric system 28, or the second auxiliary electric system 30. The motor-generator 26 may include other electrical devices, such as one or more sensors (such as for example, a motor position sensor that detects the position of the motor/generator shaft, temperature, current and voltage sensors), controllers, thermal management components to cool the machine and the electrical components, etc.

The electrical circuit 24 further includes a starter mechanism 32. The starter mechanism 32 is coupled to the engine 22, and is operable to start the engine 22 from a cranking current. The starter mechanism 32 operates independently of the motor-generator 26 to selectively start the engine 22. The motor-generator 26 does not assist the starter mechanism 32 when the starter mechanism 32 is engaged to start the engine 22. As such, the starter mechanism 32 is used exclusively to start the engine 22 for all starts. In other words, the starter mechanism 32 is used to make all first key-on starts as well as all auto-starts.

The starter mechanism 32 may include, but is not limited to, an electric starter motor that is selectively engaged to spin the crankshaft of the engine 22 in order to start the engine 22. The starter mechanism 32 may be coupled to the engine 22 in any suitable manner. For example, as is known in the art for electric starter motors, the starter mechanism 32 may be coupled to the engine 22 through meshing engagement of a starting gear (not shown) with a ring gear (not shown) that is attached to the crankshaft of the engine 22. Actuation of the electric starter motor moves the starting gear into meshing engagement with the ring gear and simultaneously spins the ring gear and thereby the crankshaft of the engine 22. The starter mechanism 32 may include a starting switch 34, such as but not limited to a solenoid or other similar device, to selectively connect and disconnect the starter mechanism 32 from the first energy storage device 36. It should be appreciated that the starter mechanism 32 may be configured in some other manner not described herein that is capable of starting the engine 22.

The electric circuit further includes the first energy storage device 36, and the second energy storage device 38. The first energy storage device 36 is disposed in a parallel electrical relationship with the starter mechanism 32, and is also disposed in a parallel electrical relationship with the first auxiliary electric system 28. The first energy storage device 36 is configured and is operable to supply the cranking current to the starter mechanism 32, necessary to start the engine 22, and/or may supply current to the first auxiliary electric system 28 and/or the second auxiliary electric system 30. The first energy storage device 36 may include any suitable battery or other device that can store sufficient energy for starting the engine 22. In one exemplary embodiment, the first energy storage device 36 is a lead acid battery, sized according to the specific needs of the starter mechanism 32. However, it should be appreciated that the first energy storage device 36 may include a device other than the lead acid battery noted above, such as an ultra-battery, ultra-capacitor, Li-Ion battery, Li-Ion Capacitor or a combination thereof.

The second energy storage device 38 is disposed in a parallel electrical relationship with the motor-generator 26, and also in a parallel electrical relationship with the first auxiliary electric system 28 and the second auxiliary electric system 30. The second energy storage device 38 is operable to receive a current from the motor-generator 26, or to provide a current to the motor generator, the first auxiliary electric system 28, or the second auxiliary electric system 30. In one exemplary embodiment, the second energy storage device 38 is one capable of high charging and discharging currents with high efficiency, such as a Li-Ion battery. However, it should be appreciated that the second energy storage device 38 may include any device that is capable of storing energy for later use, such as but not limited to some other type of battery, an ultra-capacitor, ultra-battery, Li-Ion Capacitor, some other similar device, or a combination thereof.

The first energy storage device 36 and the second energy storage device 38 may each operate at a substantially identical, nominal voltage. For example, the first energy storage device 36 and the second energy storage device 38 each operate nominally within a range of approximately 10 volts and 16 volts, i.e., a 12 volt system. However, it should be appreciated that the first energy storage device 36 and the second energy storage device 38 may be configured to operate at some other nominal voltage, such as but not limited to 6 volts, 24 volts, 48 volts, etc.

The first energy storage device 36 and the second energy storage device 38 may be significantly different in character, and include significantly different chemistries, but include a similar voltage under predetermined operating conditions. The first energy storage device 36 is intended to store energy for long durations of time and provide short bursts of power over a wide temperature range. The second energy storage device 38 is intended to store significantly less energy than the first energy storage device 36, but accept and deliver significantly more electrical power for short durations than the first energy storage device 36 is configured to do. The first energy storage device 36 is intended to be maintained at a relatively high state of charge, for example, between 80% and 95% state of charge, whereas the second energy storage device 38 is intended to be maintained at an intermediate state of charge for extended periods of time, for example, between 30% and 70% state of charge, so as to be ready to accept or provide power to and/or from the motor-generator 26.

The first energy storage device 36 is operable to store a first amount of charge and provide short bursts of power within a first amperage range over a first temperature range. The second energy storage device 38 is operable to store a second amount of charge and provide or accept short bursts of power at a second amperage over a second temperature range. The first amount of charge of the first energy storage device 36 is greater than the second amount of charge of the second energy storage device 38. The first amperage range of the first energy storage device 36 is greater than the second amperage range of the second energy storage device 38. The first temperature range over which the first energy storage device 36 is operable to provide power is greater than the second temperature range over which the second energy storage device 38 is operable to provide power.

For example, the first amount of charge of the first energy storage device 36 may be between 40 amp-hours and 85 amp-hours and the operating state of charge of the first energy storage device 36 may be between 80% and 100%, and the second amount of charge of the second energy storage device 38 may be between 8 amp-hours and 20 amp-hours and the operating state of charge of the second energy device may be between 30% and 70%. As used herein, state of charge (SOC) is defined as the percentage of a full charge of an energy storage device. As such, a 100% SOC is equal to a fully charged energy storage device. Similarly, a 50% SOC is equal to a half charged energy storage device. In a non-limiting case, a first amperage of the first energy storage device 36 during starting over a range of between −30° C. to 55° C. can be a minimum of 600 A, whereas a second amperage of the second energy saving device 38 during power assist or regeneration mode can be up to maximum of 400 A at temperatures between the range of −10° C. to 55° C.

The first energy storage device 36 and the second energy storage device 38 are selected so that, at a predetermined temperature (e.g., 25° C.), the first energy storage device 36 includes a first open circuit voltage at a first operating state of charge, and the second energy storage device 38 includes a second open circuit voltage at a second operating state of charge. The second open circuit voltage of the second energy storage device 38 at the second SOC is greater than the first open circuit voltage of the first energy storage device 36 at the first SOC.

For example, the second open circuit voltage of the second energy storage device 38 at a 50% SOC is at least 10 mV greater than the first open circuit voltage of the first energy storage device 36 at 95% SOC, and is no more than 1000 mV greater than the first open circuit voltage of the first energy storage device 36. The operating state of charge of the first energy storage device 36 may be between 80% and 100%. The operating state of charge of the second energy storage device 38 may be between 30% and 70%. It should be appreciated that the difference between the first open circuit voltage of the first energy storage device 36 and the second open circuit voltage of the second energy storage device 38, and the respective operating state of charge of each, may vary from the exemplary embodiment described above.

Figure 2:
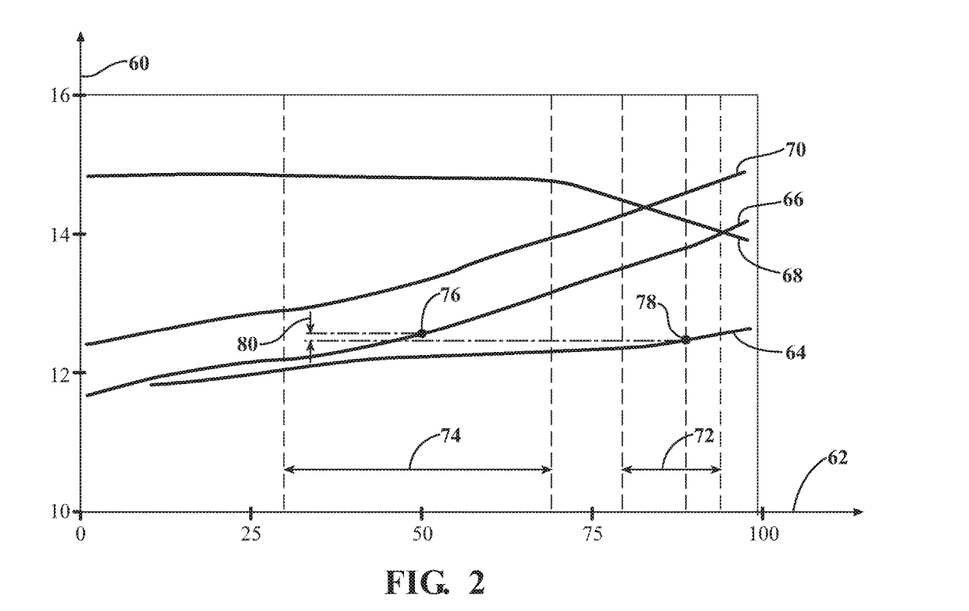
FIG. 2 is a graph showing the relationship between an open circuit voltage and a charging voltage of a first energy storage device and a second energy storage device.

The exemplary embodiment described immediately above is represented in FIG. 2. Referring to FIG. 2, a system voltage is shown along a vertical axis 60, and a state of charge is shown along a horizontal axis 62. The first open circuit voltage of the first energy storage device 36 is represented by line 64, and the second open circuit voltage of the second energy storage device 38 is represented by line 66. A charging voltage of the first energy storage device 36 is represented by line 68, and a charging voltage of the second energy storage device 38 is represented by line 70. An exemplary range of the operating state of charge of the first energy storage device 36 is generally shown at 72, and an exemplary range of the operating state of charge of the second energy storage device 38 is generally shown at 74. Within FIG. 2, the 50% SOC of the second energy storage device 38 is generally shown by the reference point 76. The 95% SOC of the first energy storage device 36 is generally shown by the reference point 78. The difference between the first open circuit voltage 64 of the first energy storage device 36 at the 50% SOC 76 and the second open circuit voltage 66 of the second energy storage device 38 at the 95% SOC 78 is generally shown between reference lines by the dimension 80. As noted, the difference 80 is equal to at least 10 mV, but is no more than 1000 mV. Accordingly, as noted above, the second open circuit voltage 66 of the second energy storage device 38 at a 50% SOC 76 is at least 10 mV greater than the first open circuit voltage 64 of the first energy storage device 36 at 95% SOC 78, and is no more than 1000 mV greater than the first open circuit voltage 64 of the first energy storage device 36.

FIG. 2 also shows that the second charging voltage 70 of the second energy storage device 38 over the exemplary range of the operating state of charge (e.g., 30% to 70%) of the second energy storage device 38, is less than the first charging voltage 68 of the first energy storage device 36 over the same state of charge range (i.e., 30% to 70%), so that the second energy storage device 38 may accept most of the charging current from the motor-generator 26, even if both the first energy storage device 36 and the second energy storage device 38 are connected in parallel when the first switch 48 is disposed in the first closed state.

The first auxiliary electric system 28, i.e., the voltage sensitive auxiliary electric system 28, is disposed in a parallel electrical relationship with both the first energy storage device 36 and the second energy storage device 38. The first auxiliary electric system 28 includes at least one electric component that operates with an allowable voltage fluctuation of equal to or less than a predetermined value (e.g., one volt). For example, the first auxiliary electric system 28 may include incandescent headlights, auxiliary motors, entertainment system components, that are sensitive to excessive voltage fluctuations that are greater than the predetermined value (e.g., 1 volt). The first auxiliary electric system 28 may include a first master switch (not shown) hat is operable to connect and disconnect the first auxiliary electric system 28 from the electrical circuit 24.

The second auxiliary electric system 30, i.e., the voltage non-sensitive auxiliary electric system, is disposed in parallel electrical relationship with both the first energy storage device 36 and the second energy storage device 38. The second auxiliary electric system 30 includes at least one electric component that operates with an allowable voltage fluctuation of greater than the predetermined value (e.g., one volt). For example, the second auxiliary electric system 30 may include an electrical device whose change in performance affected by fluctuations in voltage is not readily noticeable by the vehicle customer, such as for example, an electric heater of an HVAC system, an electric heater for an exhaust gas treatment system, a rear defogger, or heated seats. The second auxiliary electric system 30 may include at least one second master switch (not shown) that is operable to connect and disconnect the second auxiliary electric system 30 from the electrical circuit 24.

The electrical circuit 24 may further include a DC-DC converter 50. In the exemplary embodiment of the powertrain 20 shown in FIG. 1, the DC-DC converter 50 is disposed between the first auxiliary electric system 28 and the second auxiliary electric system 30. The DC-DC converter 50 may include any device that is capable of converting a source of direct current from a first voltage level to a second voltage level.

The second energy storage device 38 may include a first switch 48 for opening and closing electrical communication between the electrical circuit 24 and the second energy storage device 38. In one embodiment, the first switch 48 is a bi-directional current blocking switch having a first open state and a first closed state. The first switch 48 is operable to prevent an electrical current in both a first direction and an opposite second direction when disposed in the first open state. The first switch 48 is operable to conduct an electrical current in either the first direction or the opposite second direction when disposed in the first closed state. Notably, the electrical circuit 24 is characterized by the lack of a switch disposed between the first energy storage device 36 and the motor-generator 26. The first switch 48 may include, for example, a pair of MOSFETs (metal oxide semiconductor field effect transistors) or Wide Ban Gap switches such as a GaNFETs (Gallium nitride field effect transistors), SiCFETS (Silicon carbine field effect transistors) connected in series opposition, an electro-mechanical relay or some other similar device capable of selectively blocking current in both directions when in the second open state.

The electrical circuit 24 exhibits a first electrical resistance between the first energy storage device 36 and the motor-generator 26. The electrical circuit 24 exhibits a second electrical resistance between the second energy storage device 38 and the motor-generator 26. As used herein, the "electrical resistance" is a measure of the difficulty to pass an electric current between two locations of the electrical circuit 24. The higher the electrical resistance between two locations of the electrical circuit 24, the more difficult it is to pass an electric current therebetween. The first electrical resistance, between the first energy storage device 36 and the motor-generator 26, is greater than the second electrical resistance, between the second energy storage device 38 and the motor-generator 26. The first electrical resistance is greater than the second electrical resistance so that electrical energy from the motor-generator 26 more easily flows to the second energy storage device 38 than the first energy storage device 36, and also so that the motor-generator 26 more easily draws electrical energy from the second energy storage device 38 than from the first energy storage device 36.

As noted above, the first electrical resistance is greater than the second electrical resistance. Accordingly, a ratio of the first electrical resistance divided by the second electrical resistance is greater than 1.0. In one exemplary embodiment, the ratio of the first electrical resistance divided by the second electrical resistance is equal to or greater than 1.5. A higher ratio of the first electrical resistance to the second electrical resistance provides a higher resistance against the motor-generator 26 over-cycling the first energy storage device 36. Because the first energy storage device 36 is designed to be maintained at a high state of charge, repeated cycling of the motor-generator 26 may prematurely degrade the first energy storage device 36. Accordingly, by having the first electrical resistance between the motor-generator 26 and the first energy storage device 36 be higher than the second electrical resistance between the motor-generator 26 and the second energy storage device 38, the motor-generator 26 will tend to cycle the second energy storage device 38, and not the first energy storage device 36. The second energy storage device 38 is designed to be cycled in this manner without degradation.

The electrical circuit 24 may be configured in any suitable manner so that the first electrical resistance is greater than the second electrical resistance. For example, the length and size of the wires connecting the various components of the powertrain 20 may be designed in such a manner to control the resistance between the different components. Alternatively, discrete components, such as electrical resistors, may be incorporated into the electrical circuit 24 to increase the resistance between various components.

Referring to FIG. 1, a first resistor 40 is disposed within the electrical circuit 24 between the first energy storage device 36 and the motor-generator 26. The first resistor 40 is indicative of the first electrical resistance. Accordingly, it should be appreciated that the first resistor 40 may be configured or achieved by designing the wiring in such a manner as to provide a desired electrical resistance, or by adding a discrete component into the electrical circuit 24, such as a discrete electrical resistor. The first resistor 40 may include any components, such as but not limited to specific size and length of wiring and/or discrete electrical resistors, which have a designed resistance to the passage of an electrical current. The first resistor 40 is not disposed between the first energy storage device 36 and the starter mechanism 32. As such, the first resistor 40 does not need to be sized to carry the cranking current used to operate the starter mechanism 32.

The electrical circuit 24 may include a second resistor 42. Referring to FIG. 1, the second resistor 42 may include the inherent resistance within the electrical circuit 24 between the second energy storage device 38 and the motor-generator 26 due to the wiring cable. The second resistor 42 is indicative of the second electrical resistance. Accordingly, it should be appreciated that the second resistor 42 may be selected by designing the wiring in such a manner as to provide a desired electrical resistance.

As shown in the exemplary embodiment of the powertrain 20 in FIG. 1, the motor-generator 26 is disposed within the electrical circuit 24, between the first resistor 40 and the second resistor 42. The second resistor 42 is not disposed between the second energy storage device 38 and either the first auxiliary electric system 28 or the second auxiliary electric system 30. As such, the second resistor 42 does not need to be sized to carry the current between the second energy storage device 38 and the first auxiliary electric system 28, or between the second energy storage device 38 and the second auxiliary electric system 30.

Figure 3:
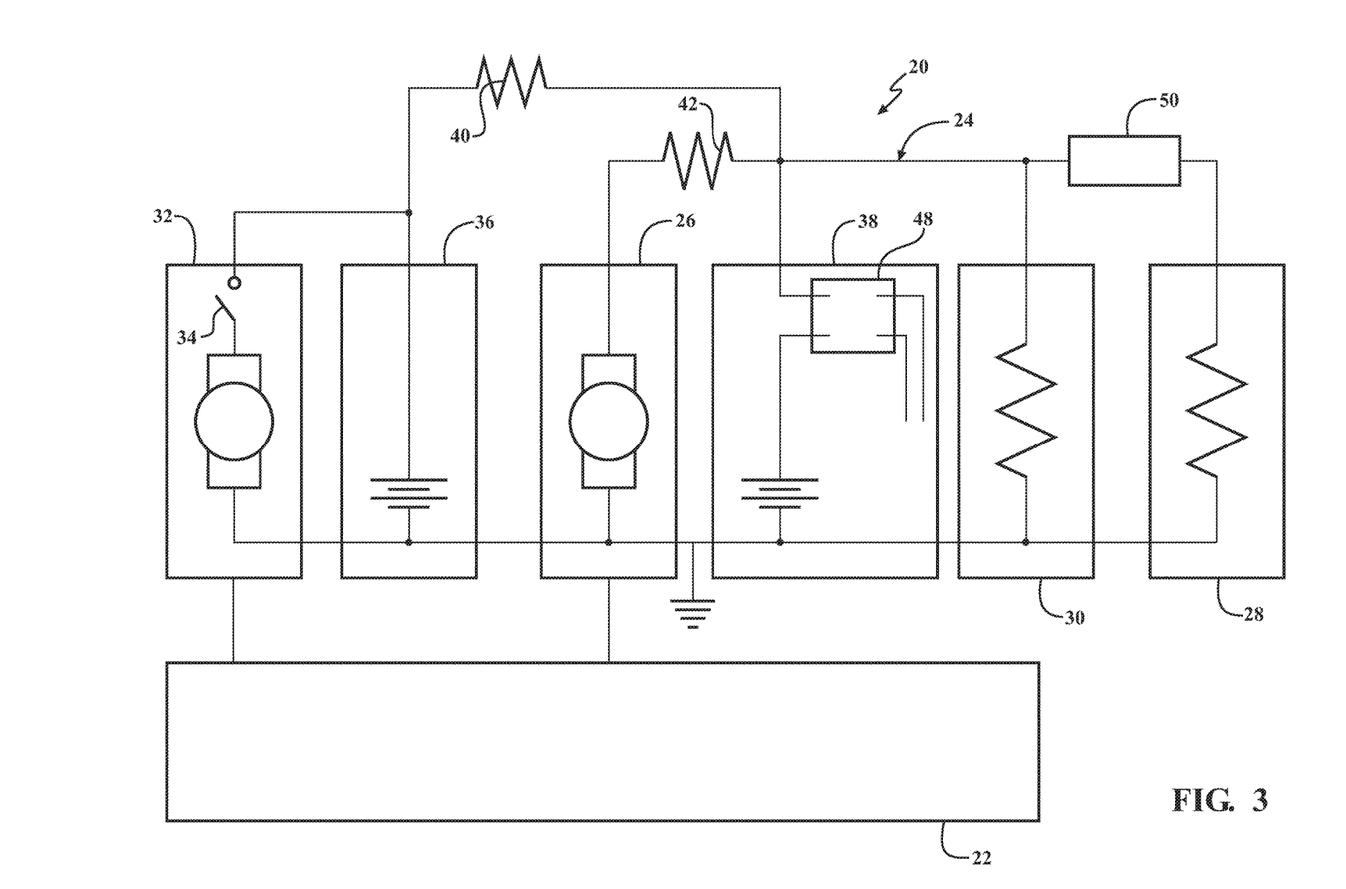
FIG. 3 is a schematic diagram of a second embodiment of the powertrain.

Referring to FIG. 3, a second embodiment of the powertrain 20 is shown. Throughout FIG. 3, the same components described in reference to FIG. 1 are identified using the same reference numerals used with reference to FIG. 1. The second embodiment of the powertrain 20 shown in FIG. 3 is similar to the first embodiment of the powertrain shown in FIG. 1.

The second embodiment of the powertrain 20 shown in FIG. 3 includes the first resistor 40 disposed in the electrical circuit 24 between the first energy storage device 36 and the second energy storage device 38. The second resistor 42 is disposed between the motor-generator 26, and the second energy storage device 38. The first resistor 40 and the second resistor 42 therefore share a common terminal with the second energy storage device 38. An electrical current flowing between the motor-generator 26 and the second energy storage device 38 must only flow through the second resistor 42, whereas an electrical current flowing between the motor-generator 26 and the first energy storage device 36 must flow through both the second resistor 42 and the first resistor 40. Accordingly, the electrical resistance between the first energy storage device 36 and the motor generator 26, i.e., the first electrical resistance, is higher than the electrical resistance between the second energy storage device 38 and the motor-generator 26, i.e., the second electrical resistance.

The first alternative embodiment of the powertrain 20 shown in FIG. 3 enables the first energy storage device 36 to supply power to the first auxiliary electric system 28 and the second auxiliary electric system 30 without having to pass the current through the second resistor 42, thereby minimizing electrical losses in the powertrain 20.

Figure 4:
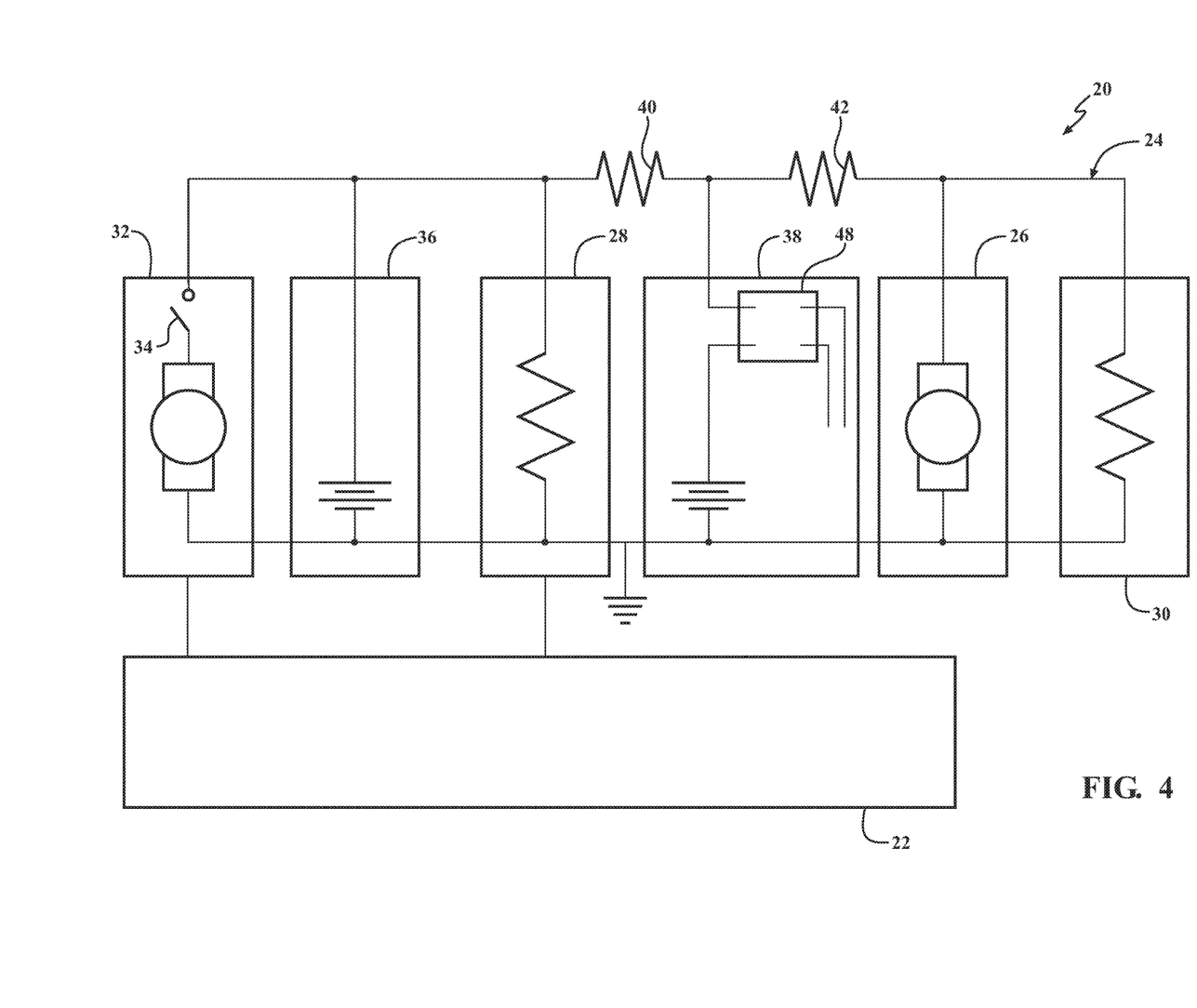
FIG. 4 is a schematic diagram of a third embodiment of the powertrain.

Referring to FIG. 4, a third embodiment of the powertrain 20 is shown. Throughout FIG. 4, the same components described in reference to FIG. 1 are identified using the same reference numerals used with reference to FIG. 1.

The third embodiment of the powertrain 20 shown in FIG. 4 shows the first auxiliary electric system 28, i.e., the load sensitive components of the electric system, positioned within the electric circuit 24 so that the first auxiliary electric system 28 may be supplied electrical power from the first energy storage device 36, without that electrical power having to pass through either the first resistor 40 or the second resistor 42. This configuration eliminates the need for the DC-DC converter 50 shown in FIG. 1 and FIG. 3. Additionally, the second resistor 42 may be configured to provide a very small resistance, in order to not significantly affect the flow of electrical power between the second energy storage device 38 and the motor-generator 26.

Figure 5:
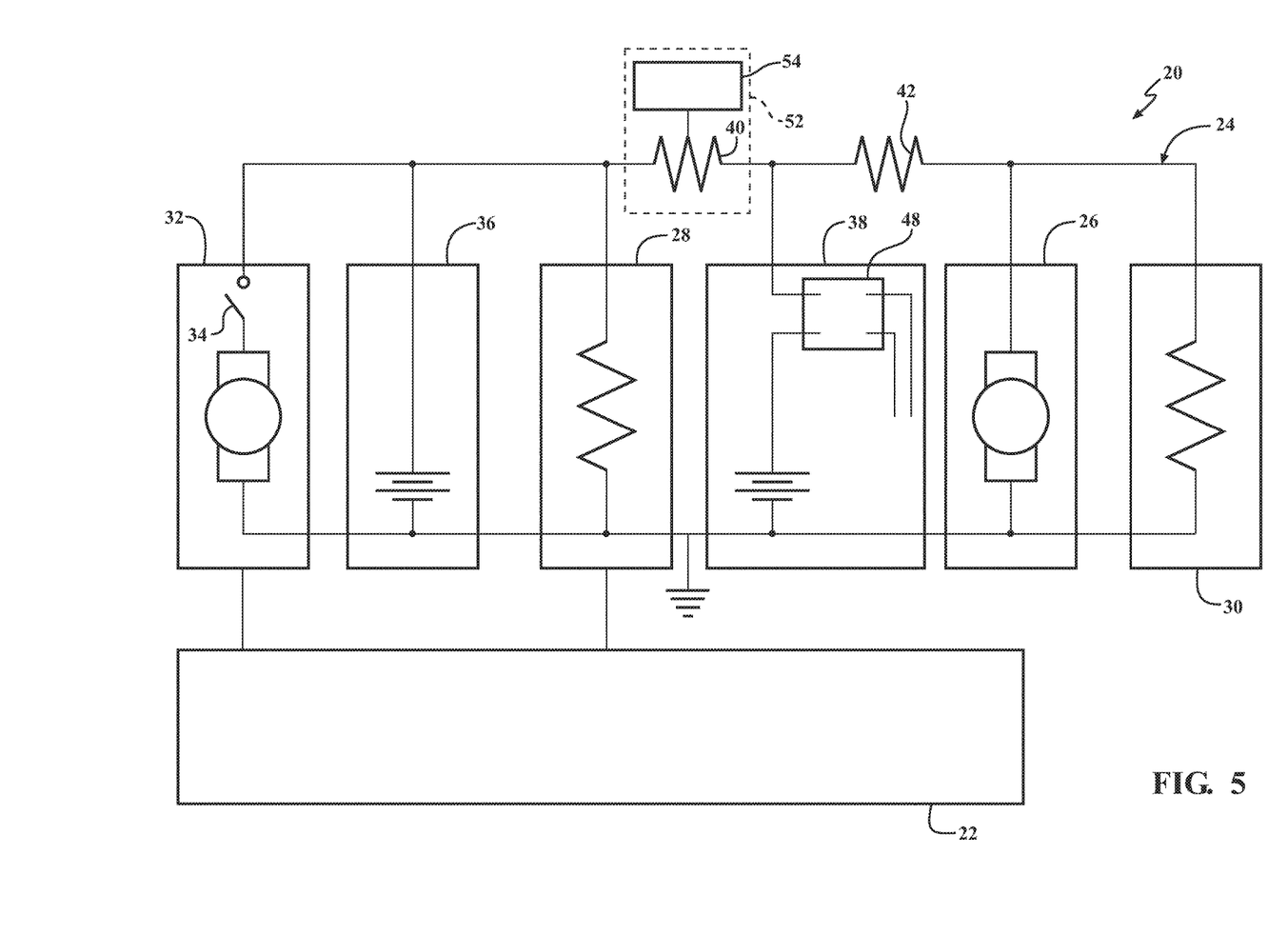
FIG. 5 is a schematic diagram of a fourth embodiment of the powertrain.

Referring to FIG. 5, a fourth embodiment of the powertrain 20 is shown. Throughout FIG. 5, the same components described in reference to FIG. 1 are identified using the same reference numerals used with reference to FIG. 1. The fourth embodiment of the powertrain 20 shown in FIG. 5 is similar to the third embodiment of the powertrain shown in FIG. 4.

The fourth embodiment of the powertrain 20 shown in FIG. 5 includes an isolation module 52 disposed within the electrical circuit 24, between the first auxiliary electric system 28 and the second energy storage device 38. The isolation module 52 includes a controller 54 that is coupled to the first resistor 40. In this embodiment, the first resistor 40 may include a non-linear resistor, or some form of a one way or a two way blocking switch. The second resistor 42 may be configured to provide a very small resistance, in order to not significantly affect the flow of electrical power between the second energy storage device 38 and the motor-generator 26. By actively controlling the first electrical resistance between the first energy storage device 36 and the motor generator 26, the first electrical resistance through the first resistor 40 may be minimized to allow electrical power from the first energy storage device 36 to power the second auxiliary electric system 30, and the first electrical resistance through the first resistor 40 may be increased to limit electrical current from flowing between the motor-generator 26 and the first energy storage device 36.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A powertrain for a vehicle, the powertrain comprising:
an engine;
an electrical circuit including:
a motor-generator coupled to the engine, and operable as either a motor to provide power to the engine, or as a generator to generate an electrical current from power supplied from the engine;
a starter mechanism coupled to the engine and operable to start the engine from a cranking current;
a first energy storage device disposed in a parallel electrical relationship with the starter mechanism, wherein the first energy storage device is operable to supply the cranking current to the starter mechanism;
a second energy storage device disposed in a parallel electrical relationship with the motor-generator, wherein the second energy storage device is operable to receive a current from the motor-generator, or provide a current to the motor generator;
a first auxiliary electric system disposed in a parallel electrical relationship with both the first energy storage device and the second energy storage device;
wherein the electrical circuit exhibits a first electrical resistance between the first energy storage device and the motor-generator, and exhibits a second electrical resistance between the second energy storage device and the motor-generator, with the first electrical resistance being greater than the second electrical resistance so that electrical energy from the motor-generator more easily flows to the second energy storage device than the first energy storage device, and so that the motor-generator more easily draws electrical energy from the second energy storage device than from the first energy storage device; and
characterized by the electrical circuit lacking a switch disposed between the first energy storage device and the motor-generator.

2. The powertrain set forth in claim 1, wherein a ratio of the first electrical resistance divided by the second electrical resistance is equal to or greater than a pre-determined value.

3. The powertrain set forth in claim 1, further comprising a first resistor disposed within the electrical circuit between the first energy storage device and the motor-generator, and providing at least a portion of the first electrical resistance.

4. The powertrain set forth in claim 3, further comprising a second resistor disposed within the electrical circuit between the second energy storage device and the motor-generator, and providing at least a portion of the second electrical resistance.

5. The powertrain set forth in claim 4, wherein the first resistor and the second resistor are arranged to share a common connection with the second energy storage device.

6. The powertrain set forth in claim 4, wherein the first resistor and the second resistor are arranged in series between the first energy storage device and the second energy storage device.

7. The powertrain set forth in claim 4 wherein the first resistor is not disposed within the electrical circuit between the first energy storage device and the starter mechanism, such that first resistor does not have to carry the cranking current used to operate the starter mechanism, and wherein the second resistor is not disposed within the electrical circuit between the second energy storage device and the first auxiliary electric system, such that the second resistor does not have to carry a current between the second energy storage device and the first auxiliary electric system.

8. The powertrain set forth in claim 3, wherein the first resistor is a non-linear resistor that can be controlled to be in a first resistance state during predetermined operating conditions, and set to a second resistance to replenish the charge of the first energy storage device during other operating conditions, wherein the first resistance state is higher than the second resistance state.

9. The powertrain set forth in claim 1, wherein the second energy storage device includes a first switch for opening and closing electrical communication between the electrical circuit and the second energy storage device.

10. The powertrain set forth in claim 9, wherein the first switch is a bi-directional blocking switch having a first open state and a first closed state, wherein the first switch is operable to prevent an electrical current in both a first direction and an opposite second direction when disposed in the first open state, and wherein the first switch is operable to conduct an electrical current in either the first direction or the opposite second direction when disposed in the first closed state.

11. The powertrain set forth in claim 1 wherein:
the first energy storage device and the second energy storage device each operate at a substantially identical voltage; and
the first energy storage device is operable to store a first amount of charge and provide short bursts of power within a first amperage range over a first temperature range, and wherein the second energy storage device is operable to store a second amount of charge and provide short bursts of power at a second amperage over a second temperature.

12. The powertrain set forth in claim 11 wherein the first amount of charge of the first energy storage device is greater than the second amount of charge of the second energy storage device, the first amperage range of the first energy storage device is greater than the second amperage range of the second energy storage device, and wherein the first temperature range over which the first energy storage device is operable to provide power is greater than the second temperature range over which the second energy storage device is operable to provide power.

13. The powertrain set forth in claim 11 wherein the first energy storage device is a lead acid battery.

14. The powertrain set forth in claim 11 wherein the second energy storage device is one of a Li-Ion battery or an ultra-capacitor.

15. The powertrain set forth in claim 1 further comprising a second auxiliary electric system disposed in a parallel electrical relationship with both the first energy storage device and the second energy storage device.

16. The powertrain set forth in claim 15 wherein the first auxiliary electric system includes at least one electric component that operates with an allowable voltage fluctuation of equal to or less than a first predetermined value.

17. The powertrain set forth in claim 16 wherein the second auxiliary electric system includes at least one electric component that operates with an allowable voltage fluctuation of greater than a second predetermined value.

18. The powertrain set forth in claim 17, further comprising a DC-DC converter disposed within the electrical circuit, between the first auxiliary electric system and the second auxiliary electric system.

* * * * *